United States Patent Office 3,511,887
Patented May 12, 1970

3,511,887
OXIDATIVE DEHYDROGENATION OF ETHYL-BENZENE USING CADMIUM OXIDE OR ZINC OXIDE CATALYST
Ronald E. Bockrath, Joseph A. Beckman, and Edward L. Kay, Akron, Ohio, assignors to The Firestone Tire & Rubber Company, Akron, Ohio, a corporation of Ohio
No Drawing. Filed Aug. 30, 1968, Ser. No. 756,377
Int. Cl. C07c *13/10, 5/18*
U.S. Cl. 260—669          11 Claims

ABSTRACT OF THE DISCLOSURE

The process described herein comprises the oxidative dehydrogenation of alkyl benzenes, such as ethyl benzene, to produce alkenyl benzenes, such as styrene. This process is based on the use of zinc oxide or cadmium oxide to catalyze the dehydrogenation.

BACKGROUND OF THE INVENTION

Field of the invention

This invention relates to the oxidative dehydrogenation of alkyl aromatic hydrocarbons for the production of alkenyl aromatic compounds. More specifically it relates to the oxidative dehydrogenation of alkyl aromatic compounds to alkenyl aromatic compounds in the presence of oxygen, catalyzed by the presence of zinc oxide or cadmium oxide.

Description of the related prior art

Styrene is produced commercially primarily by the dehydrogenation of ethyl benzene by a thermal process in which oxides of iron, potassium, magnesium and copper, or calcium-nickel-phosphate catalysts are used to produce an equilibrium between ethyl benzene and styrene by an endothermic reaction in which heat is supplied by superheated steam, Usually a temperature of 600–650° C. is used, with the heat being supplied by superheated steam at about 710° C. Since the reaction is limited by a chemical equilibrium, only a limited conversion of the feed can be effected, thereby necessitating recycling of the ethyl benzene which involves costly separation facilities.

The oxidative dehydrogenation process whereby oxygen is added to the system in the presence of a suitable catalyst, avoids the limitation imposed in thermal equilibrium dehydrogenation. Since the hydrogen removed from the alkyl group is converted to water and taken out of the reaction, there is no possible reversal of the reaction and no limiting equilibrium.

U.S. Pat. 3,371,125 proposed the use of niobium catalysts such as

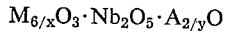

$$M_{6/x}O_3 \cdot Nb_2O_5 \cdot A_{2/y}O$$

wherein M is either chromium or tungsten or a mixture thereof, $x$ is the valence of M, A is an alkali or alkaline earth metal and $y$ is the valence of A.

U.S. Pat. 3,336,408 suggests the use of antimony oxide, alone or in combination with an oxide of vanadium, chromium, iron, cobalt, nickel or bismuth to promote the oxidative dehydrogenation of alkyl benzenes. However the catalysts suggested in the prior art are relatively expensive and it would be desirable to have effective, less expensive catalysts available for such oxidative reactions.

SUMMARY OF THE INVENTION

In accordance with the present invention, it has now been found that the dehydrogenation of alkyl aromatic hydrocarbons can be efficiently effected by oxidative dehydrogenation in the presence of zinc oxide or cadmium oxide. For example, ethyl benzene can be converted to styrene, cumene to α-methylstyrene, diethyl benzene to divinyl benzene, ethyl toluene to vinyl toluene, diisopropyl benzene to diisopropenyl benzene. This can be effected in the absence of solvent or diluent in a temperature range of 450–650° C., preferably 500–600° C., generally at approximately 575° C.

The process of this invention is exothermic and steam can be used to moderate the exothermic reaction. While the presence of steam is not necessary, it is desirable in that it helps selectivity and reduces the formation of by-products. Advantageously about 1–20 moles, preferably 5–10 moles, of steam is used per mole of alkyl aromatic compound.

The air-hydrocarbon ratio is advantageously in the range 0.5–10 moles of air per mole of hydrocarbon, so as to provide 0.1–2 moles of oxygen per mole of alkyl aromatic, preferably about 0.5 mole of oxygen per mole of alkyl aromatic.

When steam is used, it is generally advantageous to introduce it with the air and advantageously in a ratio of about 1.5–2.5 volumes of steam per volume of air.

The mixture of air and hydrocarbon, with or without steam is advantageously passed through the catalyst at a gas hourly space velocity of 50–1500, preferably about 525, volumes of air and hydrocarbon measured at 0° C. and 760 mm. Hg pressure per volume of catalyst bed per hour.

For optimum use of catalyst, it is generally preferred to deposit the catalyst on a carrier such as silica, alumina, Carborundum, etc., both of high and low surface types. The particle size of the carrier depends on the manner in which the catalyst is to be used, different size particles being used in fluid beds, fixed beds, etc. However, the size conforms substantially to that presently being used for fluid or fixed bed types. It is generally advantageous to have at least 5% of the active material deposited on the carrier.

Although the zinc oxide or cadmium oxide can be deposited directly on the carrier by any means suitable for that purpose, it is generally preferred to use a solution of a zinc or cadmium salt such as the chloride, nitrate, carbonate, etc. Then the water or solvent is evaporated and subsequently the chloride or other salt is converted to the oxide by passing air over the deposited salt to convert it to the oxide form. The reaction rate can be increased by raising the temperature, and by testing the effluent gas for chlorine or other component being replaced by the oxygen, it is easy to determine when the salt has been completely converted to oxide.

In evaluating processes of this type, a number of expressions are used, such as conversion, selectivity, yield and recovery. The percent conversion per pass is calculated as 100 times the number of moles of reactant converted divided by the total number of moles of reactant fed. The percent selectivity is 100 times the number of moles of desired product divided by the number of moles of reactant converted. The percent yield per pass is 100 times the number of moles of desired product divided by the number of moles of reactant fed. This is also equal to the conversion times the selectivity. The percent recovery is equal to 100 times the weight of hydrocarbon recovered divided by the weight of hydrocarbon fed.

PREFERRED EMBODIMENTS

The invention is illustrated by the following examples. These examples are presented merely for illustrative purposes and are not intended to limit the scope of the invention nor the manner in which the invention may be practiced. Parts and percentages are given by weight.

Example I

A catalyst is prepared by dissolving 10 grams of $ZnCl_2$ in about 100 cc. of water and then adding 90 grams of a low surface silica having an average particle size of −50 mesh and a pore volume of 60+. After thorough mixing, the water is allowed to evaporate to near dryness, following which the material is dried for 20 hours at 120° C., and then screened to obtain 50-80 mesh size. Twenty cc. (16.5 grams) of this size material is placed in a fluid bed reactor. The reactor is then heated by an electric furnace to 560° C. while passing in heated air for 3 hours at a gas hourly space velocity (GHSV) of 375, after which steam at about 1000 GHSV is added with air at 375 for an additional 4 hours. (The GHSV is based on the volumes of gas measured at 0° C. and 760 mm. of Hg pressure which are passed through one vol. of catalyst per hour.) The reactor is then cooled to room temperature overnight and then heated to the desired temperature while passing nitrogen and steam through the catalyst bed at which time the hydrocarbon (ethyl benzene) is fed in.

To illustrate the superiority of the oxidative process over a thermal process, experiments are also conducted without air. The results are tabulated below.

TABLE I

|  | Thermal | Oxidative |
|---|---|---|
| Conversion (mole percent) | 0.3 | 13.2 |
| Selectivity (mole percent) | 98 | 92.0 |
| Yield (mole percent) | 0.2 | 12.5 |

Example II

To illustrate superiority of the oxidative process over thermal process, the procedure of Example I is repeated twice, using Carborundum as the carrier, using air in one experiment and omitting the air in another experiment. As shown by the data in Table II, the oxidative process results in significantly higher conversions and yields than the thermal process under comparable conditions.

TABLE II

|  | Thermal | Oxidative |
|---|---|---|
| Temperature, ° C | 528 | 525 |
| Conversion (mole percent) | 0.2 | 14.9 |
| Selectivity (mole percent) | 100 | 95.7 |
| Yield (mole percent) | 0.2 | 14.1 |

Example III

The procedure of Example II is repeated using $CdCl_2$ in place of $ZnCl_2$ to give CdO deposited on the carrier. As shown in Table III the oxidative process gives higher conversions and yields than the thermal process.

TABLE III

|  | Thermal | Oxidative |
|---|---|---|
| Temperature, ° C | 580 | 580 |
| Conversion (mole percent) | 1.9 | 23.8 |
| Selectivity (mole percent) | 78.8 | 84.0 |
| Yield (mole percent) | 1.5 | 20.0 |

Example IV

The oxidative procedures of Examples I and II are repeated with similar satisfactory results in converting ethyl toluene to vinyl toluene, ethyl naphthalene to vinyl naphthalene, ethyl diphenyl to vinyl diphenyl and isopropyl benzene to alphamethyl styrene.

Example V

The oxidative procedure of Example I is repeated successfully using alumina in place of the silica as the carrier for the catalyst.

Example VI

The oxidative procedures of Examples I and II are repeated successfully using in place of the fluid bed, a packed bed in which the silica carrier has a particle size diameter of approximately ⅛ inch.

Example VII

The oxidative procedures of Examples I and II are repeated succesfully using the following varying amounts of metal oxide on the carrier: 5% 10%; and 20%.

Example VIII

The oxidative procedures of Examples I and II are repeated successfully using the following varying GHSV values for ethyl benzene: 50, 100 and 300 hours$^{-1}$.

Example IX

The oxidative procedures of Examples I and II are repeated successfully a number of times using instead of the reaction temperature of those examples, the following reaction temperatures respectively: 450°, 500° and 600° C.

Example X

The procedures of Examples I and II are repeated a number of times with successful results using in place of the respective chlorides used for preparing the catalyst, the corresponding bromides, nitrates and carbonates respectively.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. The process of converting alkyl aromatic hydrocarbons to the corresponding alkenyl aromatic hydrocarbons comprising the steps of:
   (a) maintaining said alkyl aromatic hydrocarbon at a temperature in the range of 450–650° C. in the presence of a gas containing free oxygen and in intimate contact with an oxide selected from the class consisting of zinc oxide and cadmium oxide, said oxygen being present in a proportion of 0.1–2 moles per mole of alkyl aromatic hydrocarbon; and
   (b) separating the resultant alkenyl aromatic hydrocarbon from unconverted alkyl aromatic hydrocarbon.

2. The proces of claim 1 in which said temperature is 500–600° C.

3. The process of claim 2 in which said oxygen-containing gas is used in a proportion to give approximately 0.5 mole of oxygen per mole of alkyl aromatic hydrocarbon.

4. The process of claim 2 in which said catalyst is zinc oxide.

5. The proces of claim 2 in which said catalyst is cadmium oxide.

6. The process of claim 1 in which said catalyst is deposited on particles of an inert carrier.

7. The process of claim 6 in which said carrier in silica and there is at least 5% of the oxide catalyst deposited thereon.

8. The process of claim 6 in which said carrier is alumina and there is at least 5% of the oxide catalyst deposited thereon.

9. The process of claim 6 in which said carrier is Carborundum and there is at least 5% of the oxide catalyst deposited thereon.

10. The process of claim 1 in which said conversion is effected in the presence of at least 5 moles of steam per mole of hydrocarbon.

11. The process of claim 10 in which said steam is mixed with air in a ratio of 1.5–2.5 volumes of steam per volume of air and said mixture is mixed with the alkyl aromatic hydrocarbon and passed through the catalyst bed at a gas hourly space velocity of about 100–12,000 volumes of gas measured at 0° C. and 760 mm. Hg pressure passed through one volume of catalyst bed per hour.

References Cited

UNITED STATES PATENTS

| | | | |
|---|---|---|---|
| 3,205,179 | 9/1965 | Soderquist et al. | 260—669 XR |
| 3,360,449 | 12/1967 | Wennerberg | 260—669 XR |
| 3,329,733 | 7/1967 | O'Grady | 260—669 |

DELBERT E. GANTZ, Primary Examiner

C. R. DAVIS, Assistant Examiner